United States Patent
Chavady

(10) Patent No.: US 11,682,280 B2
(45) Date of Patent: Jun. 20, 2023

(54) ELECTRONIC SECURITY SYSTEM HAVING WIRELESS SECURITY DEVICES

(71) Applicant: Arlo Technologies, Inc., Carlsbad, CA (US)

(72) Inventor: Noel Chavady, San Diego, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 17/188,551

(22) Filed: Mar. 1, 2021

(65) Prior Publication Data

US 2021/0272431 A1 Sep. 2, 2021

Related U.S. Application Data

(60) Provisional application No. 62/983,230, filed on Feb. 28, 2020.

(51) Int. Cl.
| | |
|---|---|
| G08B 13/196 | (2006.01) |
| H04W 76/25 | (2018.01) |
| G08B 7/06 | (2006.01) |
| H04W 52/02 | (2009.01) |

(52) U.S. Cl.
CPC .......... *G08B 13/1966* (2013.01); *G08B 7/06* (2013.01); *G08B 13/19634* (2013.01); *H04W 52/0212* (2013.01); *H04W 76/25* (2018.02)

(58) Field of Classification Search
CPC .... G08B 13/19634; G08B 25/10; G08B 3/10; G08B 25/14; G08B 29/185; H04W 76/25
See application file for complete search history.

(56) References Cited

U.S. PATENT DOCUMENTS

| | | | |
|---|---|---|---|
| 6,392,692 B1 | 5/2002 | Monroe | |
| 6,970,183 B1 | 11/2005 | Monroe | |
| 9,565,657 B2 | 2/2017 | Suresh et al. | |
| 2002/0126701 A1 | 9/2002 | Requena | |
| 2016/0029346 A1* | 1/2016 | Suresh | G08B 25/10 340/539.16 |
| 2017/0078400 A1 | 3/2017 | Binder et al. | |
| 2018/0158312 A1* | 6/2018 | Tannenbaum | G07C 9/27 |
| 2018/0308345 A1* | 10/2018 | Simon | G08B 25/14 |

(Continued)

FOREIGN PATENT DOCUMENTS

| | | |
|---|---|---|
| WO | 2006085781 | 8/2006 |
| WO | 2011159985 | 12/2011 |
| WO | 2017153093 | 9/2017 |

*Primary Examiner* — Mirza F Alam
(74) *Attorney, Agent, or Firm* — Boyle Fredrickson S.C.

(57) ABSTRACT

An electronic security system enables configuration and operation of different types of wireless security devices, such as multi-sensors, sirens/strobes, and/or key fobs, according to the specific capabilities of the devices, with minimized communication and a lower power mode. The minimized communication allows reduced data transmissions with the devices, with selective disablement of the communications system at times, which allows greater power savings and extended battery life. In one aspect, an application protocol is used to communicate with the different types of devices by applying preconfigured control parameters to the devices according to features of the devices. The application protocol can be built on a software stack executing on a wireless base station of the security system.

19 Claims, 5 Drawing Sheets

(56) References Cited

U.S. PATENT DOCUMENTS

| | | |
|---|---|---|
| 2019/0327449 A1 | 10/2019 | Fu et al. |
| 2019/0364244 A1 | 11/2019 | Siminoff et al. |
| 2019/0385429 A1* | 12/2019 | Pochtar .................. G08B 13/26 |

* cited by examiner

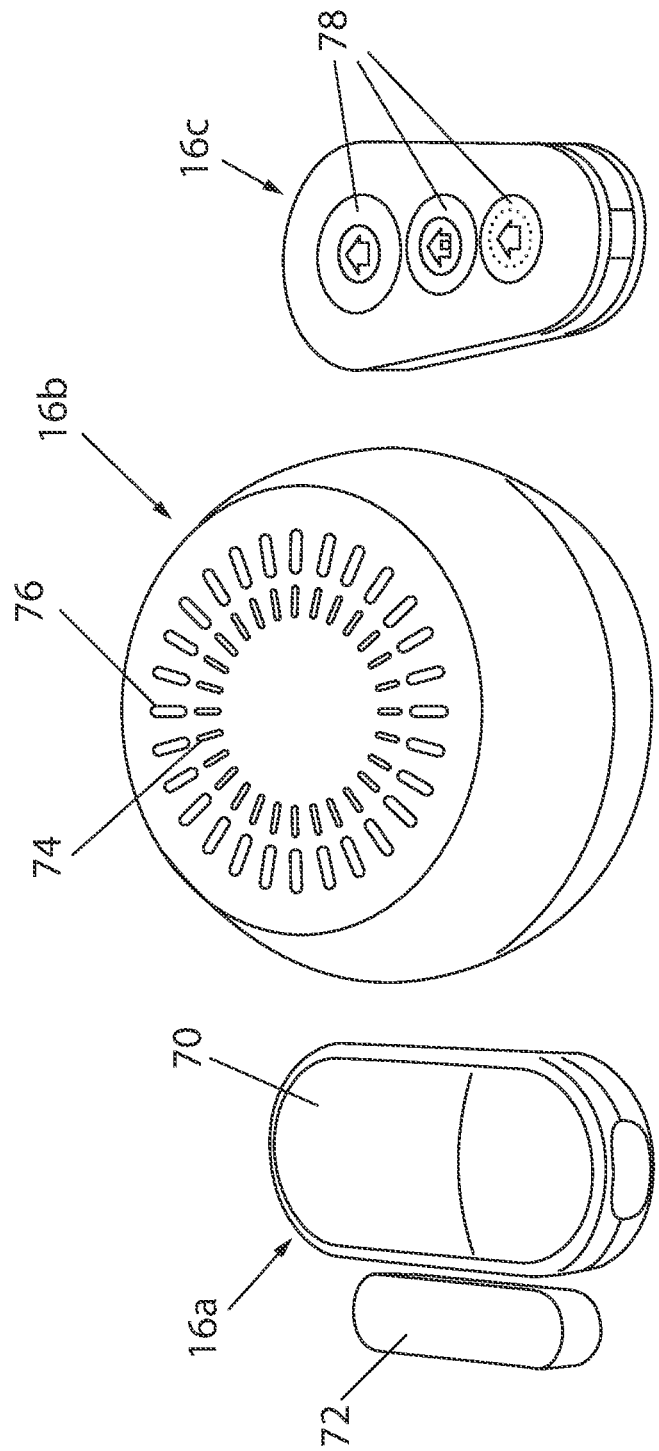

US 11,682,280 B2

ELECTRONIC SECURITY SYSTEM HAVING WIRELESS SECURITY DEVICES

CROSS-REFERENCE TO RELATED APPLICATIONS

This application claims the benefit of provisional patent application U.S. App. No. 62/983,230 filed on Feb. 28, 2020 and entitled "Electronic Security System Having Wireless Security Devices," the entire contents of which are hereby expressly incorporated by reference into the present application.

BACKGROUND OF THE INVENTION

1. Field of the Invention

The present invention relates to an electronic security system, and more particularly, to an electronic security system having wireless security devices optimized for lower power consumption.

2. Discussion of the Related Art

Electronic security systems having various security devices, such as motion sensors, window sensors, glass break sensors, and the like, are well known. To provide greater convenience for users, such devices can be made wireless, via battery power, so that users can freely position the devices in an area of interest without requiring electrical wiring. However, when such wireless security devices deplete their electrical power, it is necessary for a user to recharge and/or replace the battery at the device. This is further complicated by security devices which require greater capability, and therefore consuming more power. It is therefore desirable to provide an electronic security system having wireless security devices with reduced power consumption so that user maintenance can be minimized.

SUMMARY OF THE INVENTION

An electronic security system enables configuration and operation of different types of wireless security devices, such as multi-sensors, sirens/strobes, and/or key fobs, according to the specific capabilities of the devices, with minimized communication and a lower power mode. The minimized communication allows reduced data transmissions with the devices, with selective disablement of the communications system at times, which allows greater power savings and extended battery life. In one aspect, an application protocol is used to communicate with the different types of devices by applying preconfigured control parameters to the devices according to features of the devices. The application protocol can be built on a software stack executing on a wireless base station of the security system. The base station can communicate with the devices using a low power personal network, such as IEEE 802.15.4, and with a user for configuring and operating the devices via a mobile device/app over a wireless LAN or WAN.

Specifically then, one aspect of the present invention can provide an electronic security system including: a wireless security device including a processor executing a program stored in a non-transient medium operable to execute a security operation; and a base station in communication with the security device. The base station has a processor executing a program stored in a non-transient medium operable to: send a configuration message to the security device, the configuration message including a parameter controlling the security operation; and send a command to the security device to execute the security operation according to the parameter or receive a report from the security device executing the security operation according to the parameter. The security device operates in a higher power mode when executing the security operation and operates in a lower power mode when not executing the security operation.

Another aspect of the present invention can provide a method for electronic monitoring that includes configuring a wireless security device to execute a security operation, the security device including a processor executing a program stored in a non-transient medium and sending a configuration message from a base station to the security device. the configuration message including a parameter controlling the security operation. The method further includes sending a command to the security device to execute the security operation according to the parameter or receiving a report from the security device executing the security operation according to the parameter; operating the security device in a higher power mode when executing the security operation, and operating the security device in a lower power mode when not executing the security operation.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which:

FIG. 2 is an isometric view of an exemplar security device being a multi-sensor in accordance with an aspect of the invention;

FIG. 3 is an isometric view of an exemplar security device being an alarm in accordance with an aspect of the invention;

FIG. 4 is an isometric view of an exemplar security device being a remote control in accordance with an aspect of the invention;

DETAILED DESCRIPTION OF THE PREFERRED EMBODIMENTS

Figure 1:
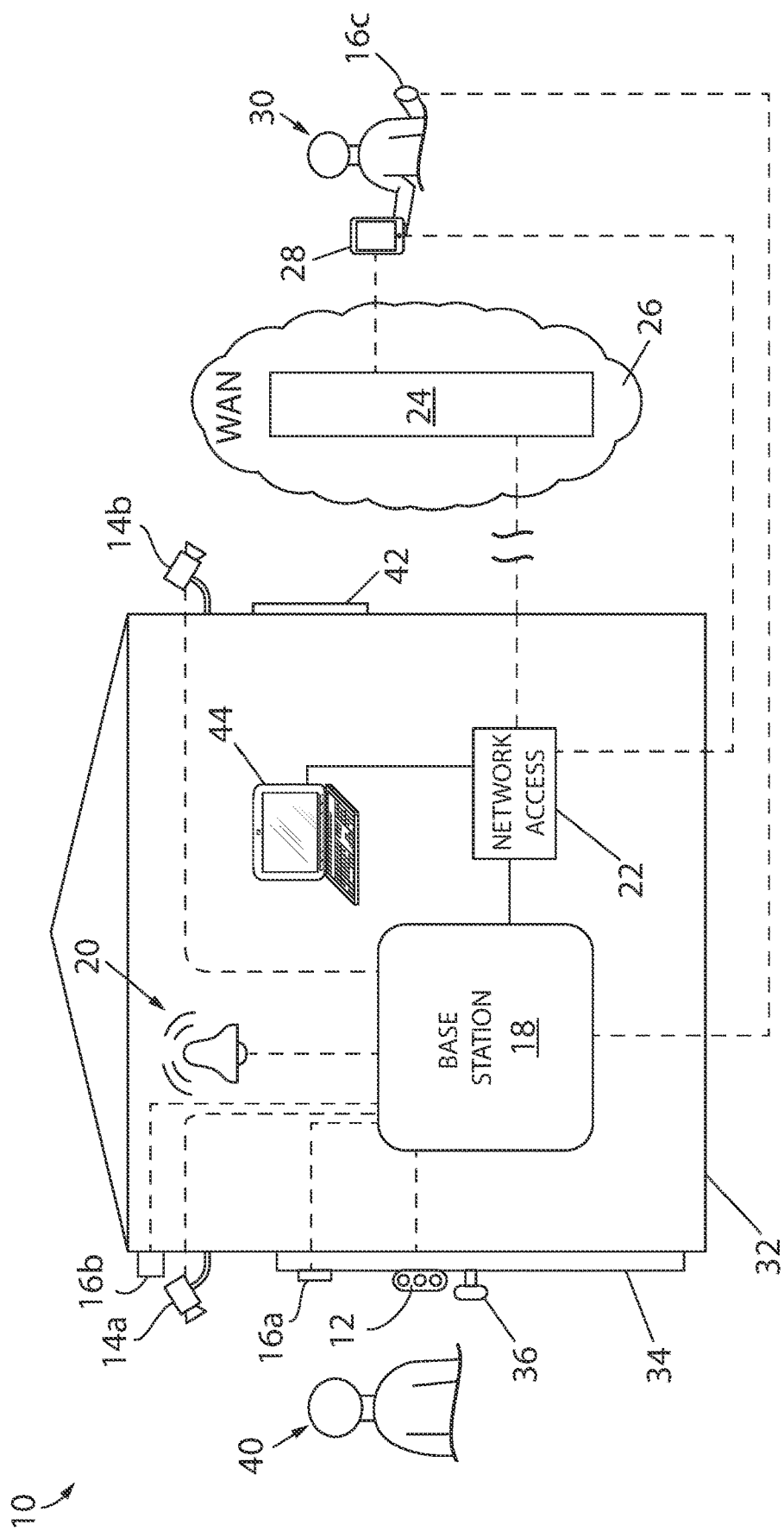
FIG. 1 is a diagram of an electronic security system having wireless security devices in accordance with an aspect of the invention.

Referring now to FIG. 1, a diagram illustrating an electronic security system 10 for security monitoring is provided in accordance with an aspect of the invention. The system 10 can include: an electronic doorbell 12; one or more cameras 14, such as first and second cameras 14*a* and 14*b*, respectively; one or more wireless security devices 16, such as first, second and third security devices 16*a*, 16*b* and 16*c*, respectively; a hub or base station 18, and/or a chime 20. The base station 18 can communicate with the doorbell 12, the cameras 14, the security devices 16 and/or the chime 20 through one or more local wireless networks. The base station 18, in turn, can connect to network access equipment 22, such as modem and/or router, for communicating with a backend system 24 through a Wide Area Network (WAN) 26 such as the Internet. The backend system 24, which could comprise one or more servers, in turn, can communicate with an electronic user device 28, such a smart phone, tablet computer, or laptop or desktop computer operated by a user 30. In addition, or alternatively, the device 28 could communicate directly with the base station 18 when nearby, such as through a local area network.

The doorbell 12 can be arranged proximal to a door 34 of the building 32. This location, for example, may be in a traditional location customarily found by visitors, such as against an exterior wall or doorframe of the building 32 adjacent to the door 34 at a height just above a door knob 36.

Each camera 14 can also be arranged with respect to a building 32, but advantageously at separate locations from the doorbell 12 to provide optimum viewing angles of visitor(s). For example, the first camera 14*a* can be arranged against the exterior wall of the building 32, several feet above the door 34, to provide an optimum angle for viewing a visitor 40 standing in front of the door. Also, the second camera 14*b* can be arranged against a different area of the building 32, such as several feet above a side or back window 42, distal from the first camera 14*a*, to provide an optimum angle for viewing any person proximal to such alternative access point.

Each security device 16 can also be arranged with respect to the building 32, but advantageously at separate locations from the doorbell 12 and/or the cameras 14 to provide optimum security operations, such as sensing event(s) and/or actuating alarms. For example, with additional reference to FIG. 2, the first security device 16*a* could be a multi-sensor, configured to operate as an entry sensor, arranged between the exterior wall or doorframe of the building 32 and the door 34 in an area between the doorbell 12 and the first camera 14*a*. With additional reference to FIG. 3, the second security device 16*b* could be configured to operate as an alarm, arranged on the exterior wall of the building 32, such as above the first camera 14*a*. With additional reference to FIG. 4, the third security device 16*c* could be configured to operate as a remote control, such as a key fob, held by the user 30 and being portable. Each security device 16 can be completely wireless, operating by battery power, in wireless communication with the base station 18. The base station 18 can communicate with the security devices 16 through a power efficient local network, such as an IEEE 802.15.4 low-rate wireless personal area networks (LR-WPAN).

In addition, a computer 44 can be connected directly to the system, such as through the network access equipment 22, for allowing a user in the building 32 direct access to the system 10, similar to the device 28. The computer 44 could comprise, for example, a tablet, laptop, or desktop computer. This can serve as a back-up to the device 28 when the user 30 is in the building 32.

Figure 5:
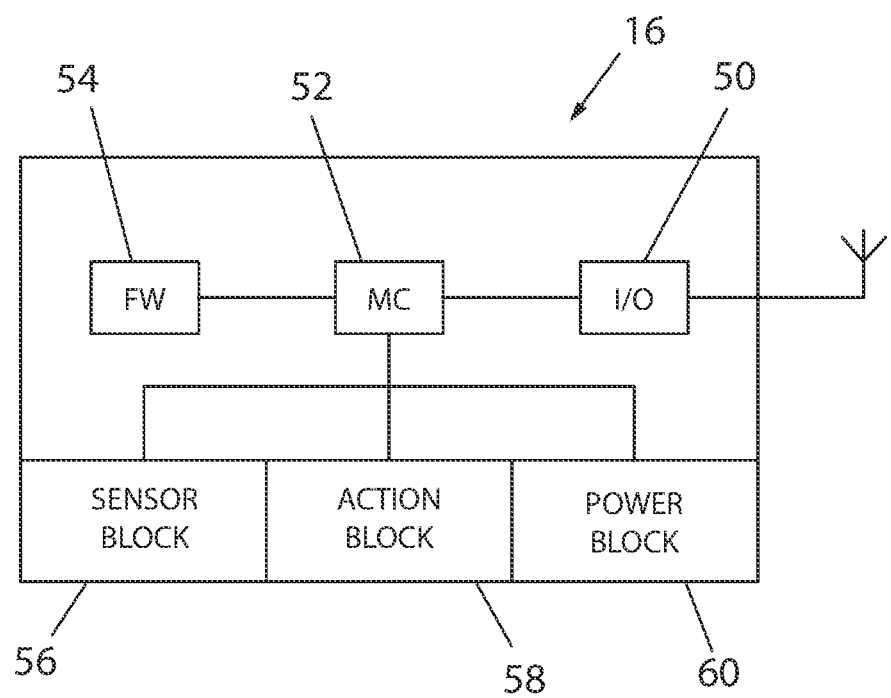
FIG. 5 is a diagram of a generic security device in accordance with an aspect of the invention.

With additional reference to FIG. 5, each security device 16 can include, among other things, a wireless communications device 50, a processor 52, a non-volatile, non-transient medium 54, a sensor block 56, an action block 58 and power block 60. The processor 52 can execute a security program stored in the non-transient medium 54 and can communicate with the base station 18 through the wireless communications device 50. The processor 52 can also monitor event(s) through one or more sensors of the sensor block 56 and can trigger action(s) through one or more devices of the action block 58. The processor 52 can also couple with a power control circuit to selectively distribute electrical power from an onboard battery to the various circuitry of the security device 16 according to different power modes.

In accordance with an aspect of the invention, for greater power savings and extended battery life, the security device 16 can operate in at least a higher power consuming mode (full or high power or full feature mode) and a lower power consuming mode (low power, low feature or sleep mode). In the higher power mode, the power block 60 can provide full operational power to all elements of the device 16. However, in the lower power mode, the power block 60 can selectively limit operational power to only certain elements of the device 16 to achieve power savings. For example, in the lower power mode, the wireless communications device 50 can be selectively disabled to save power. Also, the processor 52, the non-transient medium 54, the action block 58 can enter a reduced power or sleep mode with less power being provided. The device 16 can advantageously exit such lower power mode, and resume the higher power mode, on the occurrence of an event, such as a detection by the sensor block 56 still receiving power. The device 16 can also exit the lower power mode, and resume the higher power mode, periodically, at predetermined intervals configured by the user, for sending a "keep alive" message to the base station 18, and for receiving commands for the device 16 queued at the base station 18.

Referring again to FIG. 2, in one aspect, the security device 16 could be configured to operate as a multi-sensor, such as the first security device 16*a*. The multi-sensor could be a multiple purpose sensing device which could be configured to sense for a variety of security operations via the sensor block 56, including: sensing motion (such as by using a multi-axis accelerometer for detecting motion); sensing sound (such as by using one or more microphones for detecting sound); sensing entry (such as by using separation magnets configured between a door and door frame or a window and a window frame); sensing temperature (such as by using a resistance temperature detector and/or thermocouple for detecting temperature); sensing a water leak (such as by using one or more exposed electrical contacts for detecting a water leak); sensing vibration (such as the multi-axis accelerometer for detecting vibration); sensing humidity; sensing smoke alarms and/or carbon monoxide detectors (such as by using one or more microphones to detect sounds equivalent to smoke alarms and/or carbon monoxide detectors); and/or sensing light (such as by using one or more photodiodes and/or photocells). The multi-sensor could also include a tamper sensor (such as by using a contact switch held by an access panel of the device for securing the on-board battery) and/or a power sensor (which senses a power level of the battery). In one aspect, the multi-sensor could comprise a primary housing 70 and a secondary housing 72 containing a magnet for implementing the entry sensor. Any of the aforementioned sensing and reporting could comprise a security operation.

Referring again to FIG. 3, in another aspect, the security device 16 could be configured to operate as an alarm, such as the second security device 16*b*. The alarm could be a multiple purpose actuation device which could be configured to actuate for a variety of security operations via the action block 58 when triggered, including: activating a siren (such as by using one or more speakers 74 for projecting sound); and activating a light (such as by using one or more Light Emitting Diodes 76 for projecting light). The siren could be configured in a variety of tones, such as traditional chimes, ringing or simulated dog barks, with a variety of configurable volume levels. The light could be configured in a variety of sequences and/or patterns, such as strobing, flashing in predetermined orders, solid illumination, and the like, and with a variety of configurable brightness levels and/or colors. The alarm could also be configured to sense in a variety of security operations via the sensor block 56, including a light sensor (such as by using one or more photodiodes and/or photocells). The alarm could also include a tamper sensor (such as a contact switch held by an access panel of the device for securing the on-board battery) and/or a power sensor (which senses a power level of the battery). Any of the aforementioned actuating or sensing and reporting could comprise a security operation.

Referring again to FIG. 4, in another aspect, the security device 16 could be configured to operate as a remote control, such as the third security device 16c. The remote control could be configured to sense for a variety of security operations via the sensor block 56, including one or more buttons 78 for detecting user input for receiving commands in the system. The remote control could also include a tamper sensor (such as a contact switch held by an access panel of the device for securing an on-board battery) and/or a power sensor (which senses a power level of the battery). In one aspect, the remote control could be configured as a key fob. Actuating the one or more buttons 78 could comprise a security operation.

In accordance with an aspect of the invention, the system 10 can enable configuration and operation of the different types of security devices 16, according to the specific capabilities of such devices, with minimized communication and a lower power mode. The minimized communication allows reduced data transmissions with the devices 16, with selective disablement of the wireless communications device 50, which, in turn, allows greater power savings and extended battery life.

In one aspect, an application protocol can be used to communicate with the different types of devices 16 for their configuration and operation by applying preconfigured control parameters to the devices according to groups or features of the devices. The application protocol can be built in an application layer (providing an action, transaction number, group and checksum) of a software stack executing on the base station 18. The software stack can include a network layer (providing a stack header and payload) serving the application layer, a Medium Access Control (MAC) layer (providing a source, destination and payload) serving the network layer, and a physical layer (providing a preamble, header and payload) serving the MAC layer, such as according to the Open Systems Interconnection (OSI) Model.

Figure 6:
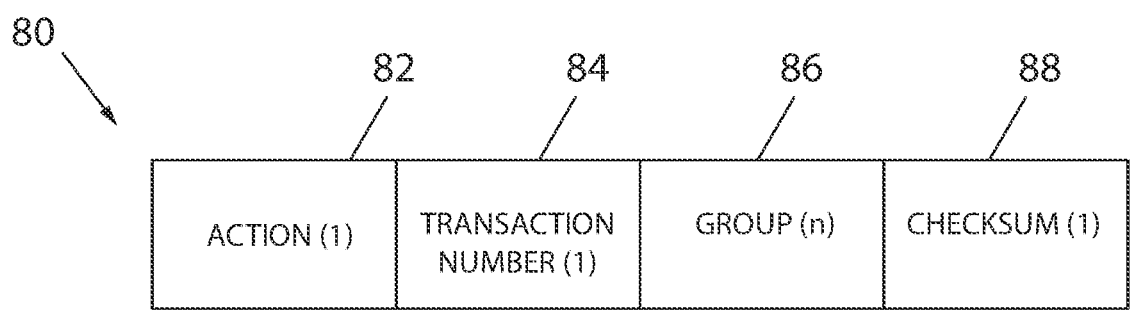
FIG. 6 is a diagram of a message packet which can be communicated in the security system of FIG. 1 in accordance with an aspect of the invention.

With additional reference to FIG. 6, a packet 90 in the application layer can be formatted to include an action field 92, a transaction number 94, a group 96 and a checksum 98. The action field 92 can indicate whether a response to the packet is required. Possible actions directed by the packet 90 could include a command to a device 16 to perform an action, a read, a write, a unicast event notification, a broadcast event notification, and/or a response to a command, read or write. The transaction number 94 can provide a unique identification number corresponding to each request-response transaction. The group 96 can provide a list of commands to be performed at the device 16 (destination of the packet). The checksum 98 can provide checksum error detection for the packet 90.

The packet 90 can be used to configure devices 16 according to different capabilities for security operations in different groups. Examples of groups can include: a basic group for controlling basic features of the device, such as resetting the device to factory default conditions and/or network status/configuration; a poll group for sending keep alive messages, defining an interval for such messages, and/or including battery and/or temperature data in such messages; a tamper group for executing a tamper detection security operation, such as detecting and reporting an opening of the access panel; a power group for executing a power level detection security operation, including occurrence of warning messages at defined low power levels; a temperature group for executing a high or low temperature detection and notification; an over the air (OTA) group for over the air progress updates, such as for updating firmware, success and/or retry; a service group for indicating specific device information and/or capabilities, such as serial number, network support, device model ID, software support, and the like; an authentication group for device authentication in the application layer, including request, response, acknowledgment and confirmation in authentication handshaking; an event group for activating or deactivating event notifications, such as for configuring motion, sound, temperature, tamper, power, water leak, and other such security operations; a contact group for configuring contact sensor sensitivity and executing a contact detection security operation; a motion group for configuring motion sensor sensitivity and executing a motion detection security operation; a water group for configuring water leak sensor sensitivity and executing a water leak detection security operation; a vibration group for configuring vibration sensor sensitivity and executing a vibration security operation; a humidity group for configuring humidity sensor sensitivity and executing a humidity security operation; a siren group for configuring siren settings and executing a siren security operation; a fob group for configuring remote control settings and executing a remote control security operation; an ambient light group for configuring ambient light sensitivity and executing an ambient light security operation; an accelerometer group for configuring accelerometer sensitivity and/or orientation; a light group for configuring strobe light settings, speed and the like, and executing a strobe light security operation; an alarm group for configuring alarm settings, reports and the like, and executing an alarm security operation; a range group for configuring a range finder, such as by using configurable pings; and/or a button group for configuring custom buttons, detecting key presses/releases, pause/resumes, and the like. Such groups with assigned parameters, or properties, can be formatted in packets 90 in different formats between the device 16 and the base station 18, such as command groups, read groups, write groups, report groups, command response groups, read response groups and/or write response groups.

Parameters set according to groups in packets can cause corresponding devices 16 to execute security operations according to such parameters. Typically, under the direction of a user, such as through the device 28, the base station 18 can send configuration commands to devices 16 specifying such parameters for the devices. For example, with additional reference to FIG. 7, the user 30 can use the device 28 to access each device 16 that is operating in the system 10 through an application program 100. Such devices 16 might include, for example, three multi-sensors ("multi_sensor_1," "multi_sensor_2" and "multi_sensor_3"), two remote controls ("key_fob_1" and "key_fob_2") and an alarm ("siren"). The user can select a particular device, such "multi_sensor_1," and enable certain features appropriate for the device, such as motion detection with a given sensitivity, by selecting corresponding icons. The base station 18 can receive such input from the application program 100 and, in turn, send a packet 90 to the corresponding device 16 with parameters in the group, such as the motion group, which command the device 16 to execute a security operation according to the parameters, such as the motion detection security operation according to the given sensitivity. The base station can communicate with the devices 16 using a power efficient local network, such as an IEEE 802.15.4 LR-WPAN.

In one aspect, one or more cameras 14 in the system 10 can be associated with a device 16. Such association can be configured by the user, such as through one or more selections in the application program 100, on the base station 18. By associating a camera 14 with a device 16, execution of a security operation by the device 16 can trigger the camera 14 to capture video of an area of interest.

For example, referring again to FIG. 1, the user 30 can command the base station 18 to associate the first camera 14a, arranged above the door 34, with the first security device 16a, a multi-sensor configured to operate as an entry sensor with respect to the door 34. Accordingly, opening the door 34 can be detected by the first security device 16a and reported to the base station 18 as a security operation, with such security operation causing the base station 18 to command the first camera 14a to capture video in front of the door 34 due to the association.

Figure 8:
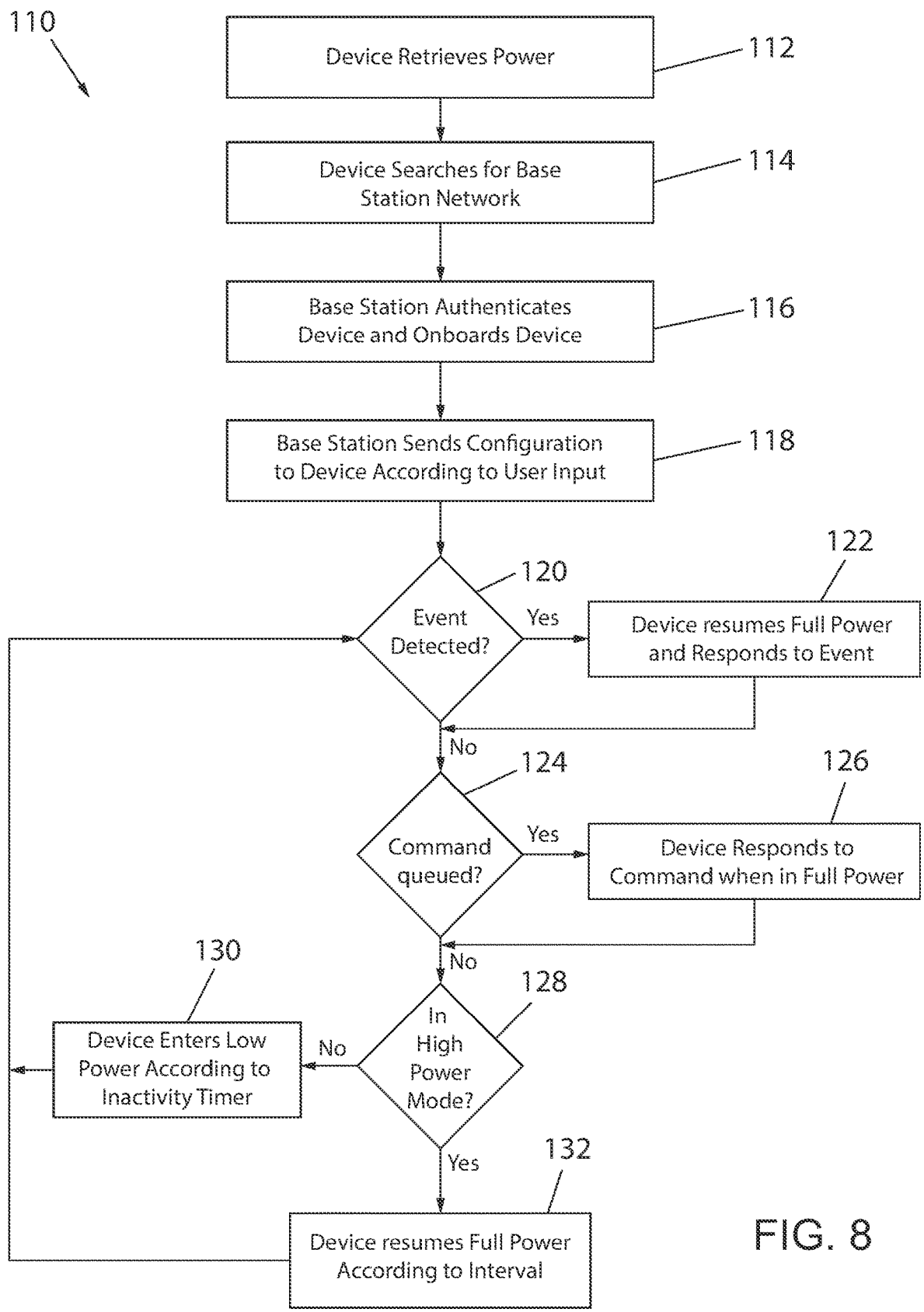
FIG. 8 is a flow chart illustrating operation of a security device in an electronic security system for reducing power consumption in accordance with an aspect of the invention.

Referring now to FIG. 8, a process 110 or flow chart illustrating operation of a security device 16 in the system 10 is provided in accordance with an aspect of the invention. At step 112, a security device 16 can be first introduced to the system 10 by the application of power to the device 16 in an area of the power efficient local network. This could comprise, for example, a user removing a tab which allows a coin cell battery of the device 16 to fully connect to the power block 60.

Figure 7:
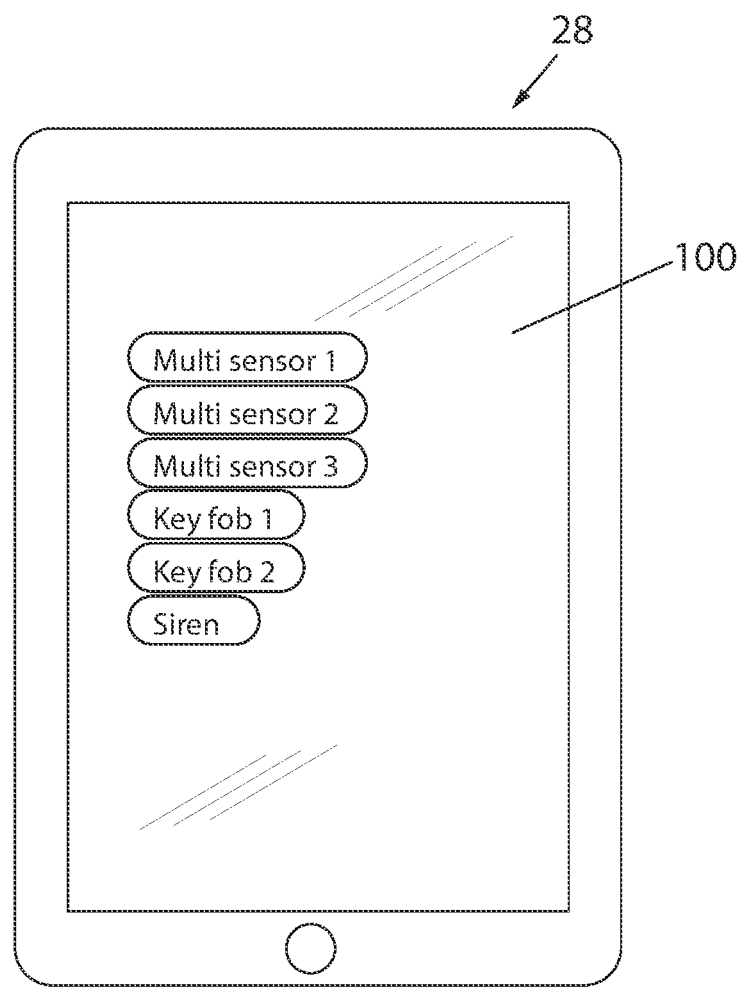
FIG. 7 is a diagram of a user device for configuring security devices in the security system of FIG. 1 in accordance with an aspect of the invention.

Next, at step 114, the device 16 can search for the base station 18 and/or the base station 18 can detect presence of the device 16. Then, at step 116, the base station 18 can authenticate the device 16, such as by determining authenticity of a serial number of the device 16, via the authentication group. Upon successful authentication, the base station 18 can onboard the device 16 as an additional resource in the system 10. At this point, the device 16 could appear as an additional security device available to the user in the application program 100 as illustrated in FIG. 7.

Next, at step 118, the base station 18 can send a configuration message to the device 16. The configuration message could be a packet 90 sent as a write command with parameters in groups to configure the device 16 to execute one or more security operations according to such parameters. The configuration message could be automatically sent by the base station 18 upon onboarding the type of device according to its serial number or device model ID. In addition, or alternatively, a configuration message could be sent by a user, through the application 100 and, in turn, the base station 18, to manually configure the device 16 to execute one or more security operations according to such parameters. At this point, the device 16 is configured for security operations in the system 10 as directed, such as detecting motion, sound, water leak, and the like, in the case of a multi-sensor, or alarming with certain tones, volume, lighting and brightness in the case of an alarm, or receiving commands corresponding to certain buttons in the case of a remote control.

Next, at decision step 120, if an event is detected in the system 10 which triggers the sensor block 56 of the device 16 according to the parameters of the device 16 ("Yes"), the process can proceed to step 122. At step 122, the device 16 can transition to the higher power mode if it is not already in the higher power mode. The device 16 can then respond to the event in a security operation in the higher power mode, such as by detecting the event and sending a report of the event in a message to the base station 18. However, if an event is not detected ("No"), the device 16 can continue monitoring for an event, whether in the higher power mode or the lower power mode.

Next, at decision step 124, if a command for the device 16 is queued at the base station 18 ("Yes"), the process can proceed to step 126. At step 126, if the device 16 is in the higher power mode, the device 16 can receive the command through the wireless communications device 50 and respond accordingly, including by returning a command response message. However, if the device 16 is in the lower power mode, the command can remain queued at the base station 18, without the device 16 receiving such command, until the device 16 otherwise resumes the higher power mode. This allows the device 16 to achieve significant power savings by selectively disabling circuitry, such as the wireless communications device 50, while in the lower power mode, and temporarily deferring execution of commands.

Next, at decision step 128, if the device 16 is in the higher power mode ("Yes"), the process can proceed to step 130. At step 130, the device 16 can enter the lower power mode to achieve power savings according to an inactivity timer. The inactivity timer could be set to a default time, such as 5 minutes, or a time configured by a user. Upon expiration of the inactivity timer without occurrence of an event requiring a security operation or a communication from the base station 18, the device 16 can enter the lower power mode. The device 16 can repeat the decisions steps 120, 124, 128 pending such entry into the lower power mode.

However, if at decision step 128 the device 16 is not in the higher power mode ("No"), but rather is in the lower power mode, the process can proceed to step 132. At step 132, the device 16 can periodically exit the lower power mode, and resume the higher power mode, at defined intervals according to a default time or time configured by the user, for sending a "keep alive" message to the base station 18, and for receiving any commands for the device 16 that are queued at the base station 18 at step 126. The device 16 can repeat the decisions steps 120, 124, 128 in the higher power mode, pending re-entry into the lower power mode upon expiration of the inactivity timer at step 130.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. An electronic security system comprising:
a plurality of wireless security devices, each including a processor that executes a program stored in a non-transient medium and that is operable to execute a security operation comprising one or one or more of detecting motion, detecting temperature, and detecting sound, wherein the security devices are categorized in one or more groups, wherein each group is defined by at least one common feature of the security devices in the corresponding group; and
a base station configured to communicate with the plurality of security devices, the base station having a processor executing a configuration program stored in a non-transient medium; the configuration program being operable to:
send a distinct configuration message to each of the one or more groups of security devices, the configuration message including a parameter controlling the security operation of the security devices in the corresponding group, wherein the parameter defines sensitivity for detecting of one or more of motion, temperature, and sound, and
send a command to at least one the security devices to execute the security operation according to the parameter or receive a report from the at least one security device executing the security operation according to the parameter, as defined by the configuration message corresponding to the group to which the at least one security device is categorized; and,
wherein each of the security devices is configured and controlled to operate in a higher power mode when executing the security operation and to operate in a lower power mode when not executing the security operation.

2. The system of claim 1, wherein at least one of the security devices comprises a multi-sensor device.

3. The system of claim 1, wherein at least one of the security devices is an alarm, and wherein the security operation includes one more of projecting sound and projecting light.

4. The system of claim 3, wherein the parameter controls volume for projecting sound or brightness for projecting light.

5. The system of claim 1, wherein at least one of the security devices is a remote control, and wherein the security operation comprises receiving user input to activate or deactivate the security system.

6. The system of claim 1, wherein at least one of the security devices is configured to periodically exit operation in the lower power mode and resume operation the higher power mode and, while operating in the higher power mode, to send a keep alive message to the base station.

7. The system of claim 1, wherein at least one the security devices is configured to detect an event while operating in the lower power mode then, upon detection of the event, transition to operation in the higher power mode for executing the security operation.

8. The system of claim 1, wherein at least one of the security devices comprises a wireless communications device that is configured to communicate with the base station, and wherein the lower power mode comprises removing power from the wireless communications device.

9. The system of claim 1, wherein the base station is in communication with the security devices through an IEEE 802.15.4 network.

10. The system of claim 1, further comprising a security camera in communication with the base station, wherein the security camera is associated with one of the security devices so that execution of the security operation by the security device causes the security camera to capture video of an area of interest.

11. A method for electronic monitoring, comprising:
configuring each of a plurality of a wireless security devices to execute a security operation comprising one or one or more of detecting motion, detecting temperature, and detecting sound, each if the security devices including a processor executing a program stored in a non-transient medium, wherein the security devices categorized in one or more groups, wherein each group is defined by at least one common feature of the security devices in the corresponding group;
sending a distinct configuration message from a base station to each of the one of the groups of security devices, the configuration message including a parameter controlling the security operation of the security devices in the corresponding group, wherein the parameter defines sensitivity for detecting one or more of motion, temperature, and sound;
sending a command to the security devices of the one of the one group of security devices to execute the security operation according to the parameter or receiving a report from the security devices executing the security operation according to the parameter, as defined by the configuration message corresponding to the group to which the security devices are categorized;
operating each of the security devices in a higher power mode when executing the security operation; and
operating each of the security devices in a lower power mode when not executing the security operation.

12. The method of claim 11, wherein at least one the security devices comprises a multi-sensor device.

13. The method of claim 11, wherein at least one the security devices comprises an alarm, and wherein the security operation comprises one or more of projecting sound and projecting light.

14. The method of claim 11, wherein at least one of the security devices comprises a remote control, and wherein the security operation comprises receiving user input to activate or deactivate the security system.

15. The method of claim 11, further comprising detecting an event while at least one of the security devices is operating in the lower power mode then, upon detection of the event, transitioning operation of the security to the higher power mode during execution of the security operation.

16. The method of claim 11, wherein at least one of the security devices periodically exits operation in the lower power mode and resumes operation in the higher power mode and, while operating in the higher power mode, sends a keep alive message to the base station.

17. The method of claim 11, further comprising associating a security camera with at least one of the security devices so that executing the security operation by the security device causes the security camera to capture video of an area of interest.

18. The system of claim 1, wherein the distinct configuration message that is sent to each of the one or more groups of security devices is preconfigured.

19. The system of claim 18, wherein the parameter controlling the security operation of the security devices in the corresponding group associated with the preconfigured distinct configuration message is user defined.

\* \* \* \* \*